US012561862B2

(12) United States Patent
Hellier et al.

(10) Patent No.: US 12,561,862 B2
(45) Date of Patent: Feb. 24, 2026

(54) METHOD AND AN APPARATUS FOR EDITING MULTIPLE VIDEO SHOTS

(71) Applicant: InterDigital Madison Patent Holdings, SAS, Paris (FR)

(72) Inventors: Pierre Hellier, Thorigne-Fouillard (FR); Emmanuel Jolly, Rennes (FR); Bharath Bhushan Damodaran, Vannes (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 91 days.

(21) Appl. No.: 18/274,923

(22) PCT Filed: Jan. 19, 2022

(86) PCT No.: PCT/EP2022/051080
§ 371 (c)(1),
(2) Date: Jul. 28, 2023

(87) PCT Pub. No.: WO2022/161822
PCT Pub. Date: Aug. 4, 2022

(65) Prior Publication Data
US 2024/0087193 A1 Mar. 14, 2024

(30) Foreign Application Priority Data

Jan. 28, 2021 (EP) ..................................... 21305106

(51) Int. Cl.
| | |
|---|---|
| *G06T 11/60* | (2006.01) |
| *G06T 3/18* | (2024.01) |
| *G06T 3/4038* | (2024.01) |
| *G06T 17/00* | (2006.01) |
| *G06V 10/56* | (2022.01) |
| *H04N 1/60* | (2006.01) |

(52) U.S. Cl.
CPC ................ *G06T 11/60* (2013.01); *G06T 3/18* (2024.01); *G06T 3/4038* (2013.01); *G06T 17/00* (2013.01); *G06V 10/56* (2022.01); *H04N 1/60* (2013.01)

(58) Field of Classification Search
None
See application file for complete search history.

(56) References Cited

U.S. PATENT DOCUMENTS

| | | | |
|---|---|---|---|
| 9,911,215 B1 | 3/2018 | Hornung et al. | |
| 2004/0114799 A1* | 6/2004 | Xu ......................... | G06V 20/40 382/173 |

(Continued)

OTHER PUBLICATIONS

Roweis et al., "Nonlinear Dimensionality Reduction by Locally Linear Embedding", American Association for the Advancement of Science (AAAS), Science, vol. 290, Issue 5500, Dec. 22, 2000, 4 pages.

(Continued)

*Primary Examiner* — Anh-Tuan V Nguyen
(74) *Attorney, Agent, or Firm* — Condo Roccia Koptiw LLP

(57) ABSTRACT

A method and an apparatus for editing at least two sequences of pictures are provided. Editing the sequences comprises modifying at least one picture of one of the at least two sequences, based on a user input, and updating at least one picture of at least one other sequence of the at least two sequences, with the modification.

18 Claims, 7 Drawing Sheets

(56) References Cited

U.S. PATENT DOCUMENTS

| | | | | |
|---|---|---|---|---|
| 2006/0120624 | A1* | 6/2006 | Jojic | G06F 16/739 |
| | | | | 382/284 |
| 2009/0059018 | A1* | 3/2009 | Brosnan | G06T 3/4038 |
| | | | | 348/E5.024 |
| 2009/0285544 | A1 | 11/2009 | Fitzgibbon et al. | |
| 2013/0182184 | A1* | 7/2013 | Senlet | H04N 5/272 |
| | | | | 348/586 |
| 2013/0201206 | A1* | 8/2013 | Bryant | H04N 1/622 |
| | | | | 345/600 |
| 2014/0241592 | A1* | 8/2014 | Yang | G06T 5/60 |
| | | | | 382/118 |
| 2017/0365037 | A1* | 12/2017 | Urban | G06T 3/403 |
| 2019/0354793 | A1* | 11/2019 | Biswas | G06T 7/593 |
| 2020/0320401 | A1* | 10/2020 | Jampani | G06N 3/047 |
| 2021/0118093 | A1* | 4/2021 | Baijal | G06N 3/084 |

OTHER PUBLICATIONS

Rav-Acha et al., "Unwrap Mosaics: A new representation for video editing", Association for Computing Machinery (ACM), ACM Transactions on Graphics, vol. 27, Issue No. 3, Article 17, Aug. 1, 2008, 11 pages.

Anonymous, "LMS color space", Wikipedia—the Free Encylopedia, URL: https://en.wikipedia.org/w/index.php?title=LMS_color_space &oldid=993784594, 4 pages, [last edited Dec. 12, 2020].

Wang et al., "Structural Deep Network Embedding", Association for Computing Machinery (ACM), KDD '16: Proceedings of the 22nd ACM SIGKDD International Conference on Knowledge Discovery and Data Mining, San Francisco, California, USA, Aug. 13, 2016, 10 pages.

Yatagawa et al., "Temporally coherent video editing using an edit propagation matrix", Computers & Graphics—An International Journal, vol. 43, Oct. 2014, 10 pages.

Deng et al., "UV-GAN: Adversarial Facial UV Map Completion for Pose-Invariant Face Recognition", Cornell University Library, Computer Science, Computer Vision and Pattern Recognition, Document: arXiv:1712.04695v1, Dec. 13, 2017, 10 pages.

Sadek et al., "A variational model for gradient-based video editing", International Journal of Computer Vision, vol. 103, May 2013, 35 pages.

Tewari et al., "MoFA: Model-based Deep Convolutional Face Autoencoder for Unsupervised Monocular Reconstruction", Institute of Electrical and Electronics Engineers (IEEE), 2017 IEEE International Conference on Computer Vision (ICCV), Oct. 22, 2017, Venice, Italy, 10 pages.

De Ridder et al., "Supervised Locally Linear Embedding", Artificial Neural Networks and Neural Information Processing, ICANN/ICONIP 2003, Lecture Notes in Computer Science (LNCS), vol. 2714, Jan. 1, 2003, 8 pages.

Chen et al., "Learn Sparse Dictionaries for Edit Propagation", Institute of Electrical and Electronics Engineers (IEEE), IEEE Transactions on Image Processing, vol. 25, Issue: 4, Apr. 2016, 11 pages.

Zhao et al., "Sketch-based Face Editing in Video Using Identity Deformation Transfer", Cornell University Library, Computer Science, Computer Vision and Pattern Recognition, Document: arXiv:1703.08738v1, Mar. 25, 2017, 9 pages.

Ahn et al., "Efficient Unwrap Representation of Faces for Video Editing", Institute of Electrical and Electronics Engineering (IEEE), IEEE Signal Processing Letters, vol. 22, Issue: 10, Oct. 2015, 5 pages.

* cited by examiner

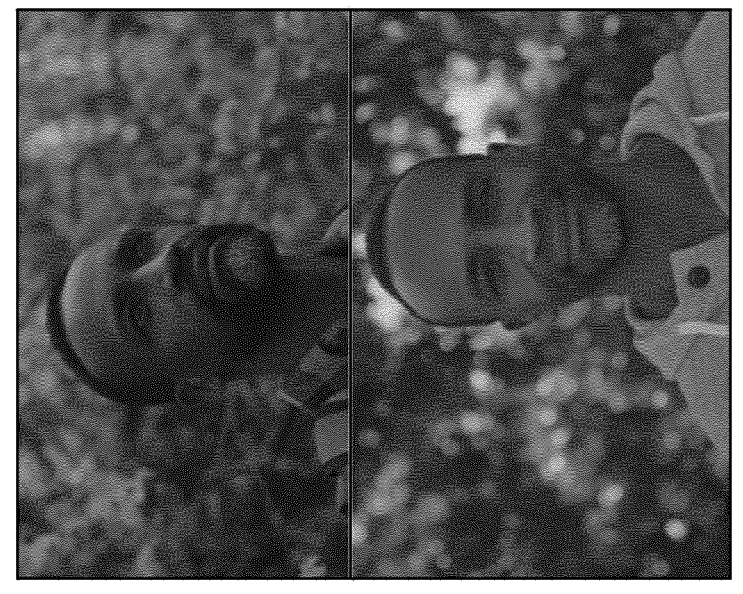
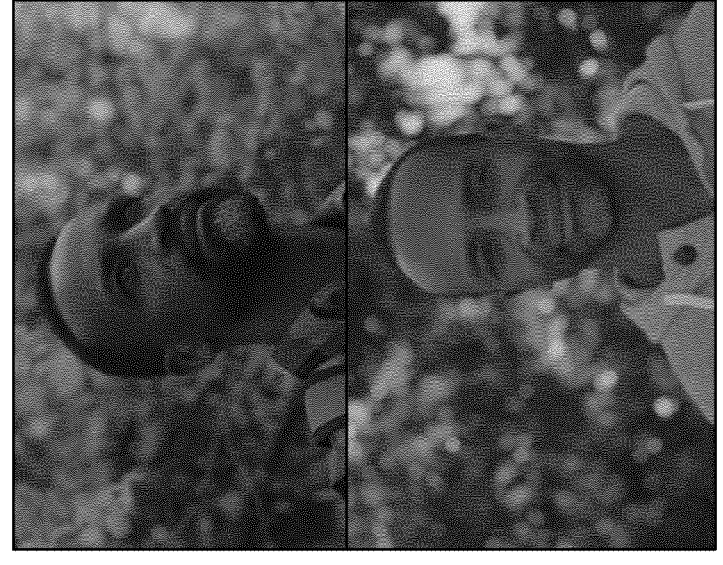
FIG. 2

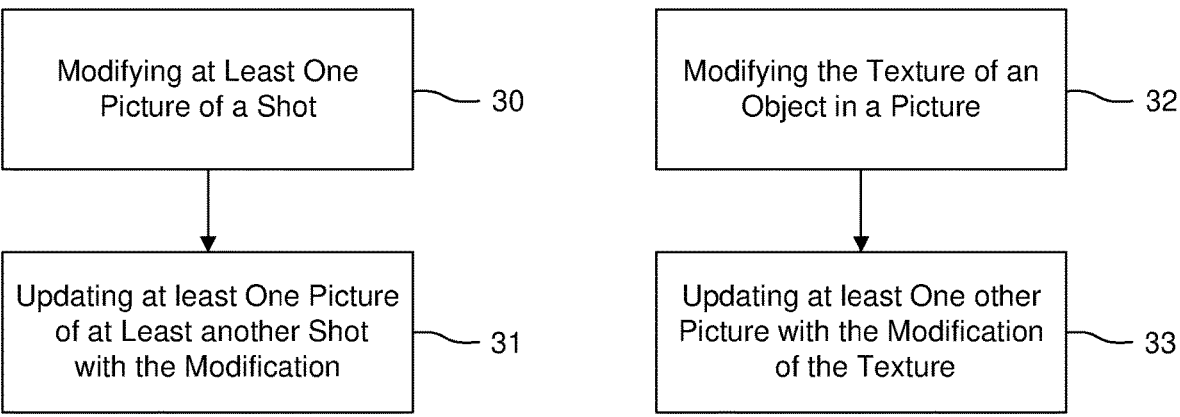
FIG. 3A                    FIG. 3B
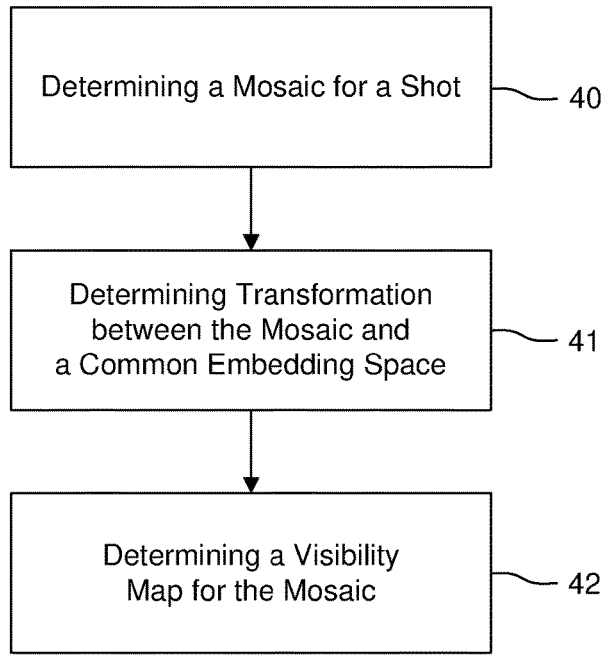
FIG. 4

Determining Tracks from Pictures of the Shot — 50

Determining an Embedding from the Tracks — 51

Determining the Mosaic for the Shot — 52

Determining Transformation between Pictures of the Shot and the Mosaic — 53

Determining Color Correction from the Mosaic for Pictures of the shot — 54

Determining Visibility Information from the Mosaic for Pictures of the Shot — 55

Visibility Area

METHOD AND AN APPARATUS FOR EDITING MULTIPLE VIDEO SHOTS

CROSS REFERENCE TO RELATED APPLICATIONS

This application is a U.S. National Stage Application under 35 U.S.C. § 371 of International Patent Application No. PCT/EP2022/051080, filed Jan. 19, 2022, which is incorporated herein by reference in its entirety.

This application claims priority to European Application No. 21305106.3, filed Jan. 28, 2021, which is incorporated herein by reference in its entirety.

TECHNICAL FIELD

The present embodiments generally relate to a method and an apparatus for editing multiple shots sharing a same object.

BACKGROUND

Post-production of video is an extremely labor-intensive process, where typically artists spend approximately one hour of editing for one second of video, only for digital makeup. A main difficulty is to guarantee a spatio-temporal consistency of an edit across pictures. An expected quality is extremely high since a user's brain is very specialized in detecting any discrepancy or weirdness on a face.

Nowadays, all actors of rank-A are touched in some form: eyebags and spots removal, rehab of jaw line. Even if a makeup has been performed onset, there is often a need for postproduction editing with digital makeup.

Hence, a situation is that more and more shots have to be edited, and each edit is tedious and time consuming. Therefore, there is a need for improving the artists productivity which impact the industry margin.

Moreover, video is getting crucial in many social platforms where the videos are stored on the application server, or cloud and shared with between people. If editing video shots for professional artists is extremely time consuming, it is an almost impossible task for a non-professional user.

Therefore, there is a need for improving the state of the art.

SUMMARY

According to an embodiment, a method for editing at least two sequences of pictures is provided, wherein editing comprises modifying at least one picture of one of the at least two sequences, updating at least one picture of at least one other sequence of the at least two sequences, with the modification, wherein the updating uses a common embedding space representative of the at least two sequences of pictures.

According to an embodiment, the at least two sequences of pictures comprise at least one object appearing in the pictures of the at least two sequences, and modifying at least one picture of one of the at least two sequences comprises modifying the at least one object.

According to another embodiment, a method for editing at least one sequence of pictures is provided, wherein editing comprises modifying texture of an object in a picture of the at least one sequence of pictures, and updating with the modification, at least one other picture of the at least one sequence or of another sequence of pictures, wherein the at least one other picture comprises the object.

According to another embodiment, the modifying of a picture or of a texture of an object is based on a used input.

According to another embodiment, an apparatus for editing at least two sequences of pictures is provided, wherein the apparatus comprises one or more processors, configured to edit the at least two sequences of pictures, and wherein editing comprises modifying at least one picture of one of the at least two sequences, updating at least one picture of at least one other sequence of the at least two sequences, with the modification, wherein the updating uses a common embedding space representative of the at least two sequences of pictures.

According to another embodiment, an apparatus for editing at least one sequence of pictures is provided, wherein the apparatus comprises one or more processors configured to edit at least one sequence of pictures, wherein editing comprises modifying texture of an object in a picture of the at least one sequence of pictures, updating with the modification, at least one other picture of the at least one sequence or of another sequence of pictures, wherein the at least one other picture comprises the object.

One or more embodiments also provide a computer program comprising instructions which when executed by one or more processors cause the one or more processors to perform the method for editing according to any of the embodiments described above. One or more of the present embodiments also provide a computer readable storage medium having stored thereon instructions for editing a video shot according to the methods described above.

BRIEF DESCRIPTION OF THE DRAWINGS

FIG. 2 shows an illustration of two shots in which a same object appears.

FIG. 3A illustrates an exemplary method for video editing according to an embodiment.

FIG. 3B illustrates an exemplary method for video editing according to another embodiment.

FIG. 4 illustrates an exemplary method for determining a universal mosaic representative of multiple shots according to an embodiment.

DETAILED DESCRIPTION

Figure 1:
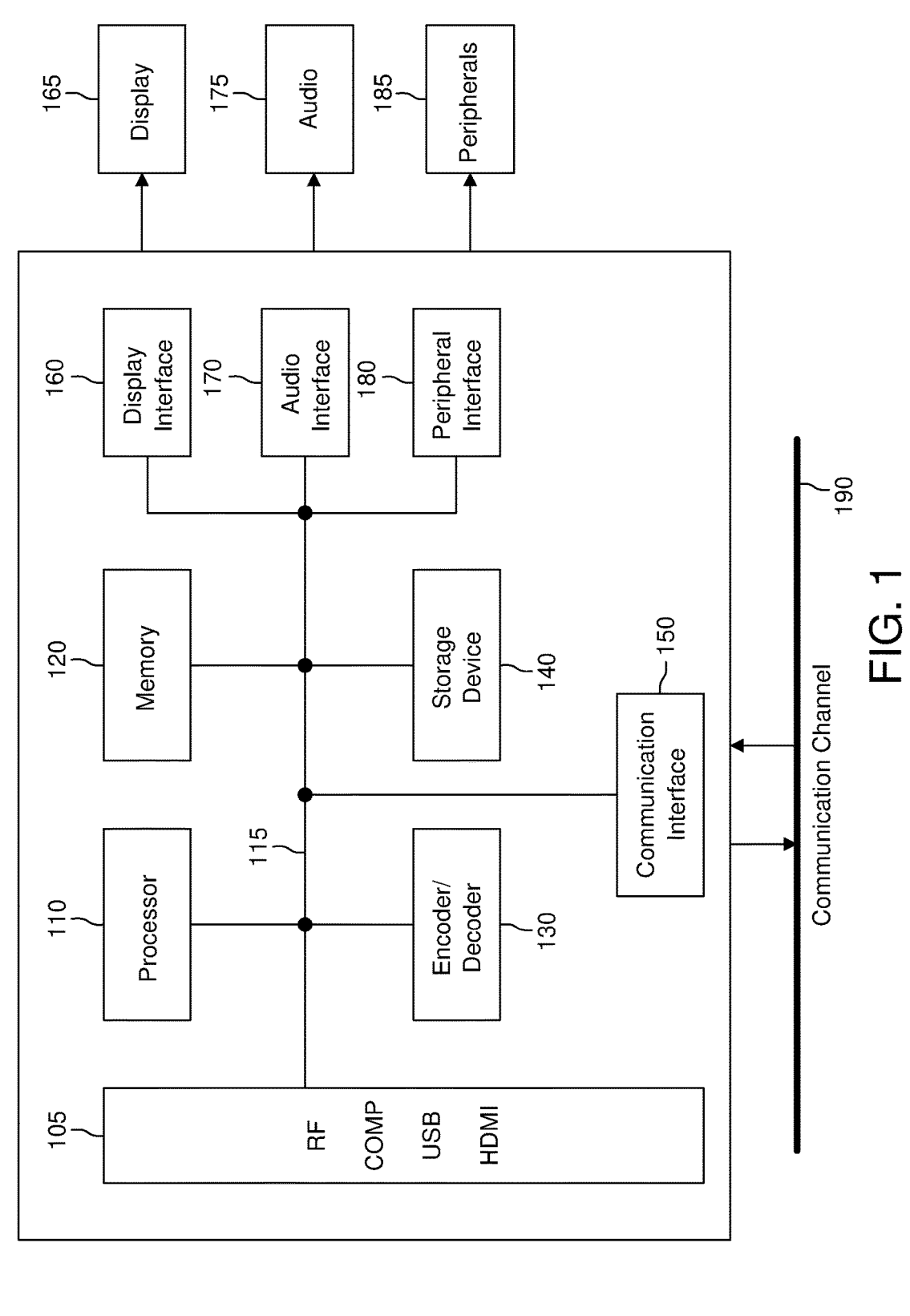
FIG. 1 illustrates a block diagram of a system within which aspects of the present embodiments may be implemented.

According to an embodiment, a method for editing multiple shots is disclosed. For instance, such a method can be used in post-production, for instance for editing multiple different shots where a same actor appears. The present principles are described herein in the case of a face of an actor appearing in multiple shots, however, the present principles could be applied to any video shots wherein an same object appears in the multiple shots, under different lighting conditions, or scene environment. The multiple shots could originate from a same video or from different videos.

In the following, a shot or a video shot is a sequence of pictures capturing a scene. In video production, a video shot is currently known as a sequence of pictures that runs for an uninterrupted period of time. A shot is a continuous sequence between two cuts in a video.

FIG. 2 shows an illustration of several frames of two shots in which a same object, here an actor, appears. The same actor appears in the two different shots where there are variations of appearance, lighting, color, camera motion and face expression and pose.

A problem that arises when an artist wants to edit the object, here the face of the actor, for instance by adding a scar, is that the edit should be edited consistently. That is the edit shall follow the face motion. Also, the multiple shots wherein the same object appears, shall be edited consistently, that is an edit on the object shall appear similar for the two shots, at a same location relative to the object and with an identical appearance. Ensuring that an edit is consistent for each shot, and consistent across shots is challenging.

FIG. 3A illustrates an exemplary method for video editing according to an embodiment wherein at least two shots, i.e. two video sequences, are edited. The two sequences of pictures comprise at least one object appearing in the pictures of the at least two sequences.

At 30, at least one picture of one of the at least two sequences is edited from a user input. For instance, the user modifies the object appearing in the pictures.

At 31, the edit is propagated to at least another picture of at least one other sequence of the at least two sequences by modifying the at least another picture with a similar modification applied to the object appearing the at least another picture.

FIG. 3B illustrates an exemplary method for video editing according to another embodiment wherein at least one video sequence is edited. According to the embodiment described in FIG. 3B, at 32, the texture of an object in a picture of the at least one sequence of pictures is modified, from on a user input. At 33, at least one other picture is updating with a corresponding modification of the texture of the object in the at least one other picture. The at least one other picture may belong to the same at least one sequence or to another sequence of pictures.

According to the present principles, the methods for video editing herein described are based on a mosaicking technique to handle the case of editing across shots. A pre-processing step is first performed on the multiple video shots so as to be able to update the video shots with the edit in a consistent manner.

Such a pre-processing step can include:

Computing independently a mosaic for each video shot, with a knowledge of a spatially-invariant embedding. In other words, each mosaic is computed as well as a transformation to a common embedding space, also called a "universal mosaic" coordinate system in the following. Such a transformation is then used for updating a video shot subsequently to an edit made by a user on another video shot.

In addition to the spatial invariance information, a visibility map is computed, which encodes which part of the mosaic is visible in the universal mosaic system.

Each mosaic is described, in terms of color, by a parametric model. In other words, the color characteristics of the mosaic are computed to enable a rapid computation of a color correction between two mosaics.

With this information of spatial and color invariance, a module can be developed that will map different mosaics. Hence, any edit on a mosaic (adding a moustache, removing a spot, modifying a texture) can be projected to any other mosaic. For instance, the module can be used for any postproduction editing tool.

An exemplary method for determining the universal mosaic representative of multiple shots is now described in relation with FIG. 4, according to an embodiment.

Figure 5:
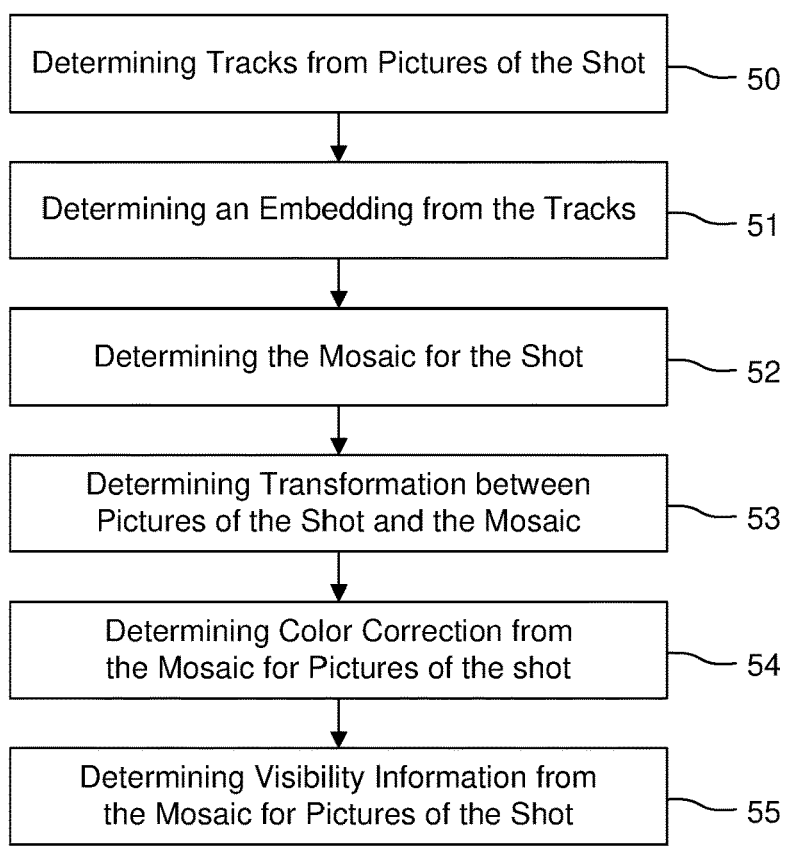
FIG. 5 illustrates an exemplary method for determining a mosaic representative of a shot according to an embodiment.

At 40, for each video shot of the multiple shots, a mosaic representative of the video shot is determined. According to an embodiment, the mosaic is determined from the method described in relation with FIG. 5. The method described in relation with FIG. 5 is based on an unfolding of the video as disclosed in Rav-Acha, A., Kohli, P., Rother, C., & Fitzgibbon, A. (2008). *Unwrap mosaics: A new representation for video editing*. In *ACM SIGGRAPH* 2008 *papers* (pp. 1-11).

With reference to FIG. 5, at 50, tracks in the video are determined from the pictures of the video. A track is a physical point that moves in time (because the object where it lies moves, or because the camera moves, or both).

Figure 6:
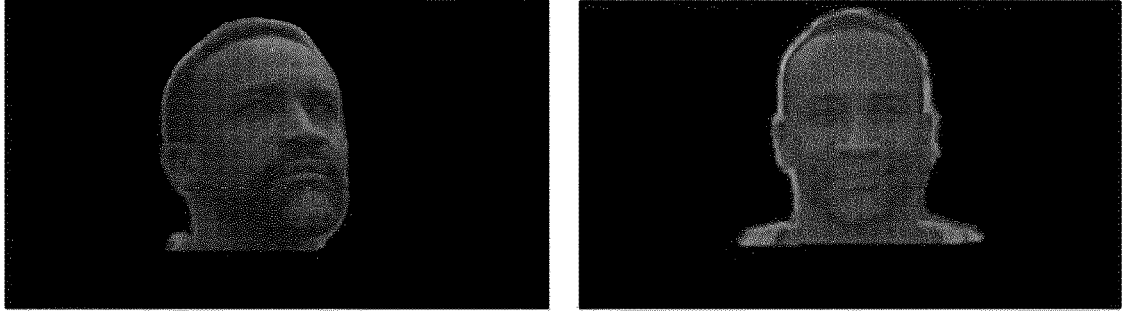
FIG. 6 shows an illustration of mosaics obtained respectively for two shots sharing a same object.

At 51, an embedding from the track space to a 2D space is determined. The embedding, which is a projection from a high dimensional space to a lower dimension space, can be seen as a projection from the track space to the mosaic space. FIG. 6 provides the obtained mosaic for the two video sequences of FIG. 2.

At 52, given the determined embedding, a stitching technique is used to reconstruct the texture of the mosaic from all textures associated to a track across all frames. Thus, the mosaic representative of the video shot is obtained.

At 53, in addition, extra parameters of the model are also computed, such as: a spatial relationship between each frame and the determined mosaic, referred to as warp. Such a warp allows to update a picture of the video shot when an edit is made on another picture of the same video shot.

At 54, an affine color correction model is determined for each frame of the video shot. The color correction model allows to take into account illumination changes in the video shot, such as a shadow that moves across the object.

At 55, visibility information is determined. Such visibility information is a spatial map related to the mosaic that indicates, at each instant, which part of the mosaic is visible at that particular moment. It allows to indicate for each frame of the video shot, which part of the mosaic is visible in the frame.

According to an embodiment, for determining the tracks in the video shot, a 3D model of the object is projected onto each frame. When the object is an actor such as in FIG. 2, the 3D model is a 3D model of the face. The tracks can be extracted directly using the 3D model.

Considering the video sequence contains a face, the sequence is first processed using a method to project a 3D model of the face on the images. For instance, a technique is described in Tewari, A., Zollhofer, M., Kim, H., Garrido, P., Bernard, F., Perez, P., & Theobalt, C. (2017) *Mofa: Model-based deep convolutional face autoencoder for unsupervised monocular reconstruction*. In *Proceedings of the IEEE International Conference on Computer Vision Workshops* (pp. 1274-1283).

Figure 7:
FIG. 7 shows an illustration of extraction of a 3D face model for two video shots sharing a same object.

FIG. 7 shows an illustration of a 3D extraction for the two video shots shown in FIG. 2. The 3D model projected on the 2D images is superimposed on the original frames. It can be seen that a 3D physical point can be followed through the entire sequence.

According to the present principles, any method that projects a 3D face model on a video containing a face can be used.

The projection of the 3D model directly provides some tracks, since a projected 3D point along time will provide consecutive coordinates of the track. The obtained tracks can then be projected onto a 2D still representation which defines the mosaic as explained above in relation with FIG. 5.

Back to FIG. 4, at 41, for each video shot of the multiple shots, transformation between the mosaic determined for the video shot at 40 and a common embedding space is determined. The common embedding space is a "universal" mosaic that is representative of all of the video shots that contained the object to which an edit is to be made.

Determining the transformation between a mosaic representative of a video shot and the universal mosaic can comprise color transform and warping. Such color transform and warping could then be used for updating a video shot subsequently to an edit made by a user on the object in another video shot.

The universal mosaic is a spatially normalized embedding of the mosaics previously determined for each video shot. Let denote $\{S_1, S_2, \ldots S_K\}$ the K video shots (sequences) wherein a same object or actor appears, and let $\{M_1, M_2, \ldots M_K\}$ be the corresponding mosaic of K shots. These mosaics are determined as mentioned above using the face capture tracks. However, it is to be noted that the present method is not bound to the face capture tracks, and any 3D projection method could be used here.

An embodiment provides a method to obtain a structure preserving embedding from these K mosaics to determine a universal mosaic (representation) U by enforcing the spatial invariance constraint, so that the correspondence could be found from one mosaic to another through the universal mosaic, which allows to project an edit from one mosaic to another.

The spatial normalized embedding must preserve the geometric structure within each individual mosaic, and also between the mosaics. This can be achieved by formalizing an objective function of the embedding as two terms, where the first term captures the intra-mosaic structure, and the second term captures inter-mosaic structure as follows:

$$\min_{U} \sum_k \sum_{i,j} \mu_{ij}^k \left\| (u_i^k - u_j^k) - d_{ij}^k \right\|^2 + \sum_{kl} \sum_{ij} (u_i^k - u_j^k) p_{ij}^{kl}$$

Where $U=[u_1^1, u_2^1, \ldots, u_N^1, u_1^2, u_2^2, \ldots, u_N^2, u_1^K, u_2^K, \ldots, u_N^K]$ and
k, l varies over the mosaics,
i,j varies over the number of the data points in each of the mosaic,
$u_1^k, u_2^k, \ldots, u_N^k$ is the universal embedding of the points from the kth mosaic (denoted as $m^k$) on to the universal mosaic and $u_1^l, u_2^l, \ldots, u_N^l$ is the universal embedding of the points from the lth mosaic (denoted as $m^l$),
$d_{ij}^k$ is the distance between the ith and jth data point in the kth mosaic, Such a distance can
be determined by the Euclidean distance as $\|m_i^k - m_j^k\|^2$ mite or directly from the 3D basel topology $\mu_{ij}^k$ can be interpreted as a similarity measure or an adjacency matrix which can be determined by exp $$\left( \frac{-d_{ij}^k}{\gamma} \right),$$

where $\gamma$ is a scaling factor to be tuned by the end-user.
$m_i^k, m_j^k$ are the ith and jth point from the kth mosaic
$p_{ij}^{kl}$ captures the correspondence:
$p_{ij}^{kl}$ is non-zero if there is a correspondence between the ith data point from kth mosaic and jth data point from lth mosaic, that is both points refer to a same location in the physical object: e.g. a specific point in a face.

The determination of the spatial invariant embedding is straight forward when the exact correspondence between mosaics is known, otherwise the correspondence matrix (permutation matrix) $p_{ij}^{kl}$ is needed to have the invariant embedding.

According to an embodiment, the tracks are extracted using the face capture tracks method (extracted by the projection of the 3D model on to the frames), each of the tracks corresponds to a unique vertex in the 3D model, thus it is known which points in one mosaic corresponds to the other mosaic (e.g, a point on the nose has a same vertex with respect to the 3D model on different mosaics).

Different various embeddings are possible. According to a variant, a direct embedding is obtained, where no computation of embedding is involved thanks to the 3D model. The embedding is determined directly using the projection of the 3D model on the 2D plane. Since the projection of the basel topology onto the 2D plane, known as standard UV map, is known, the embeddings $u_i$'s (points of the universal mosaic) are known without explicit computation and also the exact correspondence $(p_{ij}^{kl})$ between the different mosaics. According to this variant, it is just needed to keep track of the embedding and the standard UV map. The warping and the visibility map between the individual mosaic and the universal mosaic are also determined.

According to another variant, the embedding U is determined by aligning the known correspondences $(p_{ij}^{kl})$. Any neural network-based methods like in Wang D., Cui P and Zhu W., 2016 August, "*Structural deep network embedding*" *Proceedings of the 22nd ACM SIGKDD international conference on knowledge discovery and data mining*, pp 1225-1234 can be used. According to this variant, the latent distribution of the face capture tracks are enforced to align with respect to known correspondences at the same time it preserves the structure of the individual mosaic in the latent space.

According to another variant, the embedding U is determined based on a local linear embedding (LLE). An example of a LLE is given in Roweis S. T. and Saul L. K. (2000) "*Nonlinear dimensionality reduction by locally linear embedding*", *science*, 290(5500), 2323-2326.
According to this variant, the LLE comprises:
a determination of a weight to reconstruct a sample from its neighbors, and
a determination of the embedding based on the weights previously determined.
According to this variant, a weight matrix is constructed, from which each point can be reconstructed from its neighbors also with respect to the neighbors from other mosaic. Since the correspondence between the points from different mosaics is known, the weight matrix can be constructed by concatenating weights of each individual mosaic. The spatially invariant embedding is then determined based on the constructed weight matrix.

When determining the spatially normalized embedding, warping is also determined for each video shot between the individual mosaic of the video shot and the universal mosaic, to define which part of the universal mosaic corresponds to each individual mosaic and to allow to a bi-directional projection between an individual mosaic and the universal mosaic.

Figure 8:
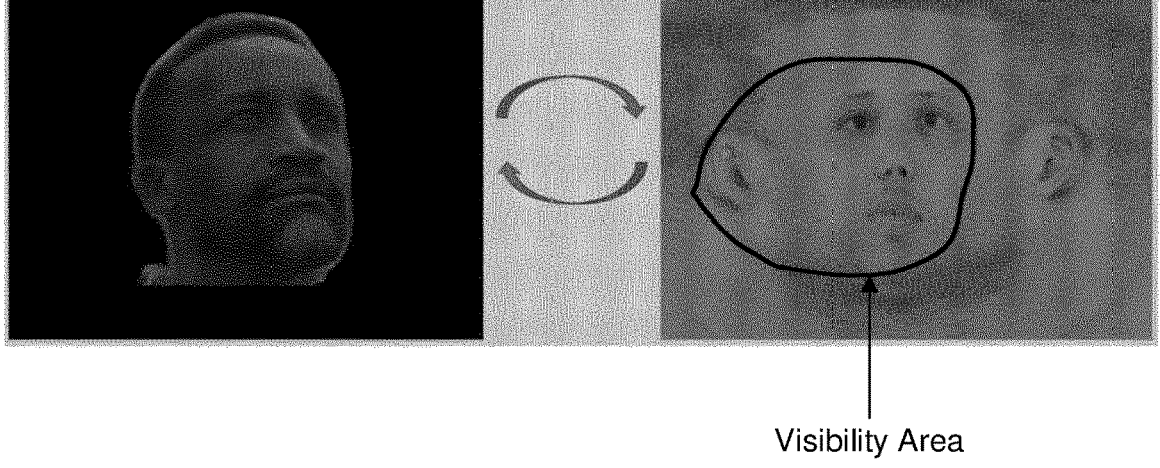
FIG. 8 shows an illustration of a mosaic (left part) obtained for a shot and its visibility map to a corresponding universal mosaic (right part).

At 42, once the spatially normalized embedding has been determined, a visibility map is determined for each video shot from the multiple shots. The visibility map allows indicating for a determined mosaic, which part of the determined mosaic is visible in the universal mosaic. FIG. 8 shows on the left a mosaic obtained for a shot and on the right a universal mosaic obtained from multiple shots wherein the same actor's face appears. The area in the universal mosaic wherein the mosaic is visible is also shown.

With the warping information and the visibility map, for each point in the mosaic representative of the video shot, its correspondence in the universal mosaic is geometrically known.

Reversely, for each point in the universal mosaic being in the visibility area, its correspondence is known in the video mosaic.

Color and Luminance Consistency

According to an embodiment, information is encoded to account for changes in luminance and color between the multiple shots, with a few parameters that will be used, during the interactive reprojection part.

Several variants described below are possible, but the methods steps are similar:

1. When determining the mosaic for each shot, a compact description of the luminance/color profile is computed. Depending on the model that is used, the information may vary from three floating values to several thousand.
2. The color profile is stored jointly with the mosaic.
3. At editing time, when a new shot is considered, the color profiles of the new shot and the current shot onto which editing has been made are compared to create a color transformation. There are various possibilities that can be offered to artists, from a simplest model to more complicated ones.

According to a variant, a first and simplest model is to account for an illuminant change. It can be modeled by a diagonal matrix in LMS color space. The LMS (Long Medium Short) color space can be obtained through a simple CAT (Chromatic Adaptation Transform) matrix. To obtain the three coefficients of the diagonal transformation, the mean grey point can be computed. For this solution, the mean color point of each shot on the mosaic can be computed, denoted as $M_i$ for shot i. The transformation from shot j to shot i in the LMS color space is then a diagonal transformation:

$$\begin{pmatrix} \dfrac{M_j(0)}{M_i(0)} & 0 & 0 \\ 0 & \dfrac{M_j(1)}{M_i(1)} & 0 \\ 0 & 0 & \dfrac{M_j(2)}{M_i(2)} \end{pmatrix}$$

Wherein $M_j(0)$ refers to the first coordinate of the vector $M_j$, which has three coordinates. The CAT matrix is typically a 3×3 matrix, and the M coordinates are obtained through multiplication of the input RGB vector with the CAT matrix.

For this transformation, only three parameters are needed to encode the transformation.

According to another variant, a more complex transformation can be obtained for the luminance channel with histogram specification. For each shot, a luminance histogram is computed and encoded using a fixed number of n bins (typically, from 16 to 128). Then, a regularized histogram specification method can be used to retrieve a transformation that will account for changes in global lighting.

According to another variant, the histogram specification method can be applied not only for luminance, but for all R, G and B color channels. Hence, three histograms are computed using n bins. A same regularized histogram match can be used.

According to another embodiment, in case a richer and more flexible color transformation were necessary, instead of a global spatially-invariant color profile, a local color profile can be defined. To do so, according to an embodiment, since the 3D model tracks are known, for a priori known areas of the spatial mask of the face which can be from the chin to the forehead. Some color profiles are determined. The exact same methods as described above can be used. For each area, this can be for instance a color histogram on a vicinity of a given point. Hence, for that area, a color/luminance transformation can be computed. To compute a global transformation, a spatially-smooth version (i.e., using B-splines) can be computed according to the set of local color corrections.

Figure 9:
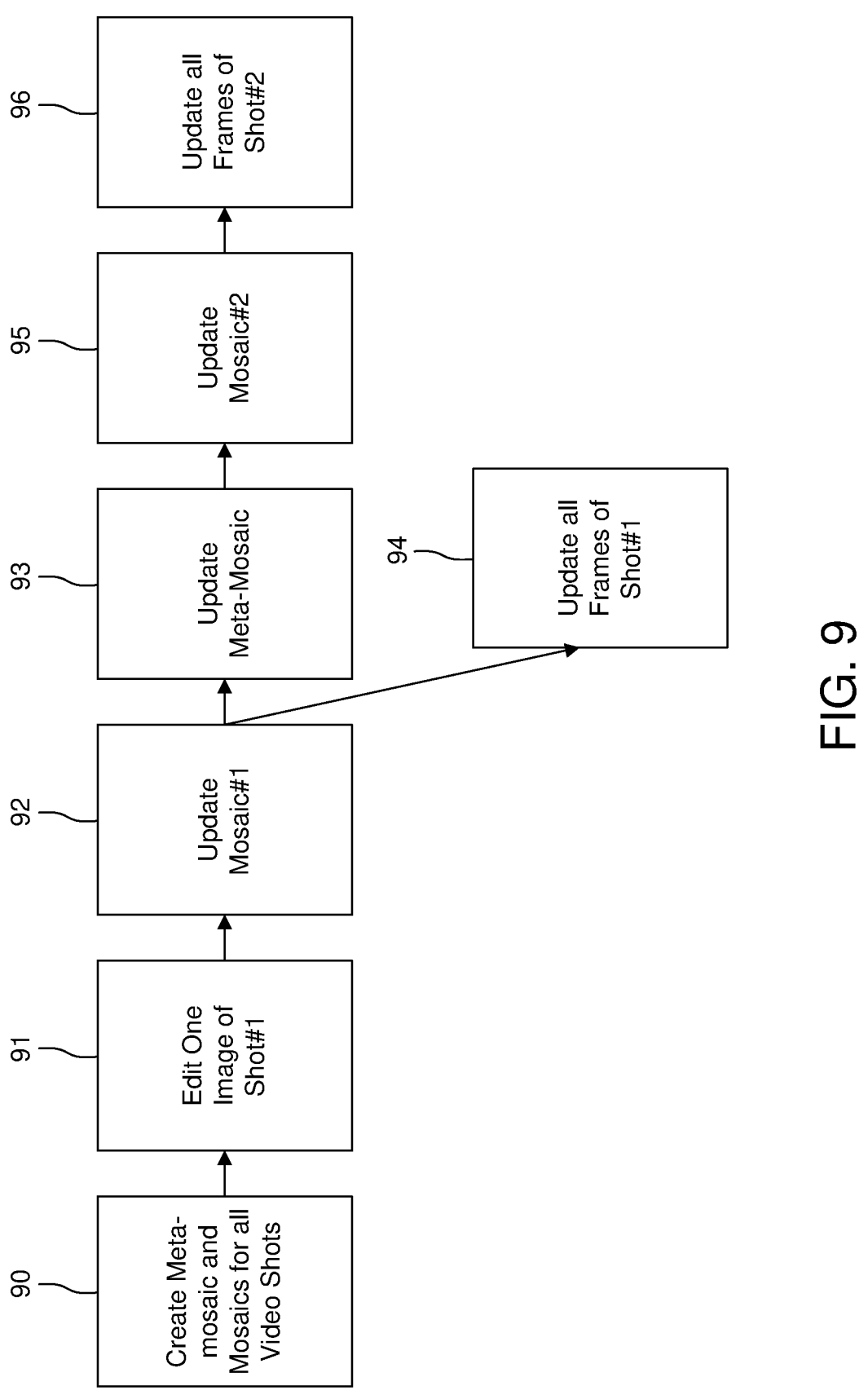
FIG. 9 illustrates an example of operations for editing multiple video shots sharing a same object, according to an embodiment.

An example of a usage in a postproduction tool is further described below in relation with FIG. 9 illustrating an example of operations for editing multiple video shots sharing a same object, according to an embodiment.

A dedicated software wherein the present principles are implemented is called on a shot (called shot #1), either on demand, or automatically at a pre-process step (90) of post-production (generally called 'ingest').

At 90, the software identifies the different faces present in shot #1. For each face, a) the mosaic of the face is determined for the whole shot and the warps between the mosaic and the pictures of the shot are determined, as well as visibility maps and color information model between each frame and the mosaic. The mosaic is stored as a standard image and the warps, visibility maps and color information are being stored as metadata in a proprietary format (encoded as a succession of images for example). Such determinations can be done offline, for instance using the method described above in relation with FIG. 5. In some case, it could currently take half an hour on a typical shot.

This step a) is performed for all the shots wherein the face appears, providing a mosaic, warps, visibility maps and color information for each shot.

b) the universal representation (also referred as the meta-mosaic) is determined, such that the universal representation can be used to propagate an edit to other shots. For instance, the determination of the universal representation can be performed using the method described in relation with FIG. 4. This universal representation of the mosaic is stored as a standard image. The bi-directional warps between the universal mosaic and the mosaic of each shot, visibility map and color transform between the mosaic and its universal representation are also stored as metadata in a proprietary format (encoded as an image for example).

Figure 10:
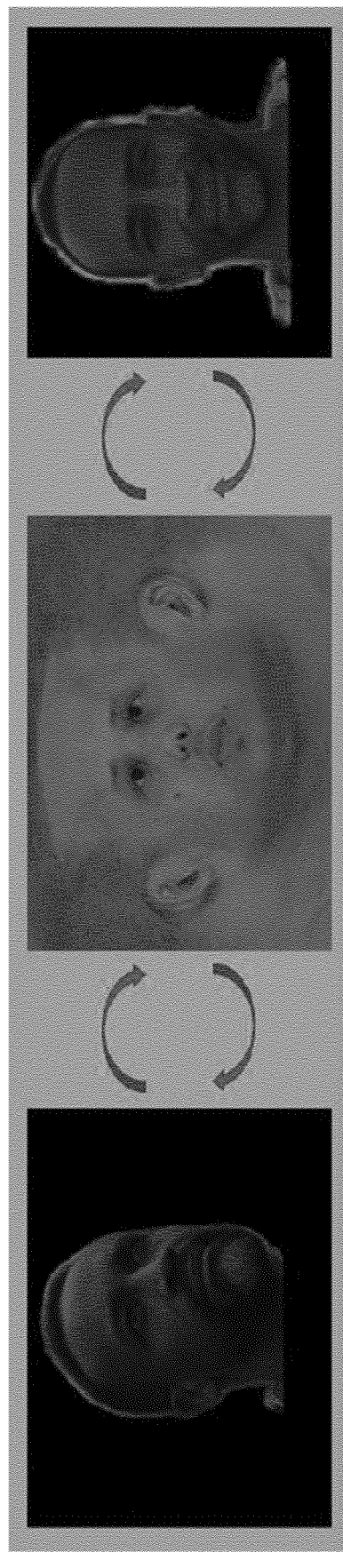
FIG. 10 shows an illustration of mosaics (left part and right part) representative of two video shots and a universal mosaic (center part) representative of multiple shots including the two mosaics.

As an example of the pre-process steps, FIG. 10 shows an illustration of mosaics (left part and right part) representative of two video shots and a universal mosaic (center part) representative of multiple shots including the two mosaics.

Then, the multi-shot editing can be done interactively, or inline.

An artist can do edits on the mosaic of a shot, for instance shot #1. The edit can be done on a specific frame (at 91) and projected to the mosaic at 92. Or, the edit can be done directly on the mosaic. In this case, step 91 is skipped.

Figure 11:
FIG. 11 shows an illustration of an edit applied to mosaics (left part and right part) representative of two video shots using a universal mosaic (center part) representative of the two video shots.

The artist can see the result of the edit on the shot in real time using a dedicated node in a compositing software (like a plugin in The Foundry Nuke for example), as illustrated on FIG. 11 left part showing an edit (adding a scar on the face) on a mosaic of a first shot.

At 93, the edit is also similarly projected in real time to the universal representation of the mosaic. An example of such a projection is illustrated in FIG. 11 center part showing a scar added on the face.

At 94, the edit is propagated to all the frames of the first shot using the mosaic of the first shot. If the mosaic for the same actor in another shot has been determined (e.g. shot #2), at 95, the edit is propagated to the mosaic determined for this shot. An example of such a propagation is illustrated on FIG. 11 right part showing the scar added on the mosaic of shot #2.

The artist can see the edit being propagated to the second shot, in real time: the edits from the universal representation of the mosaic of shot #1 are being propagated to the mosaic of shot #2, with color adjustment of the edit if needed. Then, at 96, using the warps, visibility map and color transforms determined for shot #2, the edit is propagated to all the frames of shot #2.

From an artist viewpoint, this process can be seen as the edits of one frame of a shot being instantly propagated to all the frames of 2 (or more) shots in real time. The artist does not even need to know there is a mosaic in the process.

According to an embodiment, the methods described above are implemented as instructions causing one or more processors to perform the methods steps.

According to an embodiment, FIG. 1 illustrates a block diagram of an example of a system in which various aspects and embodiments described above can be implemented. System 100 may be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

According to an embodiment, system 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, one or more input video shots, mosaic images, warpings, 3D models, color transform information, visibility maps, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during pre-processing steps of the method described herein and/or video editing. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the 120 bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Unless indicated otherwise, or technically precluded, the aspects described in this application can be used individually or in combination.

Various numeric values are used in the present application. The specific values are for example purposes and the aspects described are not limited to these specific values.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A video editing method comprising:
   determining, for each of at least two video shots, a mosaic representative of the respective video shot, wherein at least one same object appears in pictures of the at least two video shots;
   determining, for each of the at least two video shots, a transformation between the mosaic representative of the respective video shot and a common embedding space representative of the at least two video shots, wherein determining the transformation between the mosaic representative of the respective video shot and the common embedding space comprises determining color transform and warping from the mosaic to the common embedding space; and
   responsive to a modification of a first picture of a first video shot of the at least two video shots, updating a second picture of a second video shot of the at least two video shots with the modification using the common embedding space, wherein updating the second picture with the modification is based on the determined color transform and warping.

2. The method of claim 1, wherein the modification of the first picture comprises a modification of the at least one same object.

3. The method of claim 1, wherein updating the second picture with the modification based on the determined color transform and warping comprises:
   projecting the modification from the mosaic representative of the first video shot to the common embedding space using the determined color transform and warping to determine a projected modification; and
   projecting the projected modification from the common embedding space to a mosaic representative of the second video shot using the determined color transform and warping.

4. The method of claim 1, wherein the common embedding space enforces a spatial invariance constraint between each mosaic representative of the at least two video shots.

5. The method of claim 1, further comprising determining a visibility map indicating for the mosaic representative of the respective video shot, which part of the mosaic representative of the respective video shot is visible in the common embedding space.

6. The method of claim 1, wherein determining the mosaic representative of the respective video shot comprises:

determining 2D trajectories of determined points in the respective video shot;

determining an embedding from the 2D trajectories of determined points to a 2D space; and determining the mosaic representative of the respective video shot from the embedding, using a stitching technique.

7. The method of claim 6, wherein determining the 2D trajectories of determined points in the respective video shot is based on a 3D model of the same object projected onto each picture of the respective video shot.

8. The method of claim 1, further comprising:

determining a spatial relationship between each picture of the respective video shot and the mosaic representative of the respective video shot;

determining a color correction model for each picture of the respective video shot from the mosaic representative of the respective video shot; and determining visibility information indicating, for each picture, which part of the mosaic representative of the respective video shot is visible in the picture.

9. The method of claim 1, wherein the common embedding space is determined using a neural network.

10. The method of claim 1, wherein the common embedding space is determined using local linear embedding.

11. An apparatus comprising:

a processor configured to:

determine, for each of at least two video shots, a mosaic representative of the respective video shot, wherein at least one same object appears in pictures of the at least two video shots;

determine, for each one of the at least two video shots, a transformation between the mosaic representative of the respective video shot and a common embedding space representative of the at least two video shots, wherein the processor configured to determine the transformation between the mosaic representative of the respective video shot and the common embedding space comprises the processor being configured to determine color transform and warping from the mosaic to the common embedding space; and responsive to a modification of a first picture of a first video shot of the at least two video shots, update a second picture of a second video shot of the at least two video shots with the modification using the common embedding space, wherein the processor configured to update the second picture with the modification is based on the determined color transform and warping.

12. The apparatus of claim 11, wherein the modification of the first picture comprises a modification of the at least one same object.

13. The apparatus of claim 11, wherein the processor configured to update the second picture with the modification based on the determined color transform and warping comprises the processor being configured to:

project the modification from the mosaic representative of the first video shot to the common embedding space using the determined color transform and warping to determine a projected modification; and project the projected modification from the common embedding space to a mosaic representative of the second video shot using the determined color transform and warping.

14. The apparatus of claim 11, wherein the common embedding space enforces a spatial invariance constraint between each mosaic representative of the at least two video shots.

15. The apparatus of claim 11, wherein the processor is further configured to determine a visibility map indicating for the mosaic representative of the respective video shot, which part of the mosaic representative of the respective video shot is visible in the common embedding space.

16. The apparatus of claim 11, wherein the processor configured to determine the mosaic representative of the respective video shot comprises the processor being configured to:

determine 2D trajectories of determined points in the respective video shot;

determine an embedding from the 2D trajectories of determined points to a 2D space; and determine the mosaic representative of the respective video shot from the embedding, using a stitching technique.

17. The apparatus of claim 11, wherein the processor is further configured to:

determine a spatial relationship between each picture of the respective video shot and the mosaic representative of the respective video shot;

determine a color correction model for each picture of the video shot from the mosaic representative of the respective video shot; and determine visibility information indicating, for each picture, which part of the mosaic representative of the respective video shot is visible in the picture.

18. A non-transitory computer readable storage medium having stored thereon instructions for causing one or more processors to perform the method of claim 1.

* * * * *